United States Patent [19]

Hitomi

[11] Patent Number: 5,273,234
[45] Date of Patent: Dec. 28, 1993

[54] SPINNING REEL WITH SPOOL SHAFT AND SLIDER

[75] Inventor: Yasuhiro Hitomi, Sakai, Japan
[73] Assignee: Shimano, Inc., Osaka, Japan
[21] Appl. No.: 921,974
[22] Filed: Aug. 4, 1992

Related U.S. Application Data

[63] Continuation of Ser. No. 539,441, Jun. 18, 1990, abandoned.

[30] Foreign Application Priority Data

Jun. 16, 1989 [JP] Japan .............................. 1-70967[U]

[51] Int. Cl.⁵ ............................................. A01K 89/01
[52] U.S. Cl. ...................................................... 242/241
[58] Field of Search .................. 242/241, 242, 158.3; 74/58

[56] References Cited

U.S. PATENT DOCUMENTS

| | | | |
|---|---|---|---|
| 4,339,095 | 7/1982 | Gifford | 242/242 |
| 4,427,163 | 1/1984 | Noda | 242/241 |
| 4,512,531 | 4/1985 | Tunoda | 242/241 |
| 4,865,262 | 9/1989 | Tsunoda | 242/241 |

FOREIGN PATENT DOCUMENTS

| | | | |
|---|---|---|---|
| 0054065 | 5/1947 | France | 242/241 |
| 0941464 | 1/1949 | France | 242/242 |
| 1176814 | 4/1959 | France | 242/241 |
| 60-26626 | 8/1985 | Japan . | |

*Primary Examiner*—Daniel P. Stodola
*Assistant Examiner*—Michael R. Mansen
*Attorney, Agent, or Firm*—Dickstein, Shapiro & Morin

[57] ABSTRACT

A spinning reel is formed of a reel body, a spool shaft supported by the reel body to be movable in a fore and aft direction, a cam shaft interlocked with rotation of a handle shaft rotatably supported by the reel body, a slider disposed between the spool shaft and the cam shaft and including a guide member engaging cam or traverse grooves defined in the cam shaft. The slider is divided into a first slider body guided by the guide portion and mounted on the spool shaft and a second slider body having the guide member, and the first slider body is interlocked with the second slider body only in the moving direction of the spool shaft.

2 Claims, 2 Drawing Sheets

SPINNING REEL WITH SPOOL SHAFT AND SLIDER

This application is a continuation of application Ser. No. 07/539,441 filed Jun. 18, 1990, now abandoned.

BACKGROUND OF INVENTION

1. Field of the Invention

The present invention relates to a spinning reel, and more particularly to a spinning reel comprising a reel body, a spool shaft supported by the reel body to be movable in a fore and aft direction, a cam shaft interlocked with rotation of a handle shaft rotatably supported by the reel body, a slider extending between the spool shaft and the cam shaft and including a guide member engaging traverse grooves defined in the cam shaft, and a guide portion defined in the reel body for guiding the slider in moving direction of the spool shaft.

2. Description of the Prior Art

A known example of spinning reels of the above-noted type including the slider extending between the spool shaft and the cam shaft and having the guide member engaging the traverse grooves defined in the cam shaft is designed to convert rotational drive transmitted from the handle shaft to the cam shaft into axial drive with respect to the cam shaft through the guide member thereby to reciprocate the spool shaft through the slider. The slider is fixed at one end thereof to the spool shaft and defines a perforation in the other end thereof through which the cam shaft extends. The guide member engages the traverse grooves defined in an outer periphery of the cam shaft whereby rotation of the cam shaft allows the spool shaft to be axially moved with respect to the cam shaft through the slider.

However, it is difficult to assemble the spool shaft and the cam shaft parallel to each other, which causes the following problem in the conventional structure. That is, if the cam shaft is obliquely supported relative to the spool shaft due to an assembling error, the cam shaft is in forced contact with the perforation defined in the slider, which hinders axial movement of the slider with respect to the cam shaft.

In order to solve this problem, a space is provided between an inner periphery of the perforation of the slider and the outer periphery of the cam shaft conventionally to absorb the error in the parallel relationship between the spool shaft and the cam shaft. However, even with this structure, variations in the engaging depth between the traverse grooves and the guide member cause intense clattering and sluggish movement of the slider and thus the spool shaft. The uneven engaging depth also results in wear occurring in different positions of the guide member, which affects the durability of the guide member.

SUMMARY OF THE INVENTION

An object of the present invention is to provide a spinning reel free of the uneven engaging depth between the guide member and the traverse grooves of the cam shaft even if the spool shaft is not exactly parallel to the cam shaft, and thus allowing the spool shaft to move smoothly in the fore and aft direction.

In order to achieve the aforementioned object, a spinning reel according to the present invention is characterized by the slider divided into a first slider body guided by the guide portion and mounted on the spool shaft and a second slider body having the guide member, the first slider body being interlocked with the second slider body only in the moving direction of the spool shaft.

With the characteristic structure as noted above, since the first slider body is interlocked with the second slider body, only in the moving direction of the spool shaft, the spool shaft is movable in the fore and aft direction with movement of the second slider body. In addition, the first slider body mounted on the spool shaft and the second slider body supported by the cam shaft do not restrain movement relative to each other in a direction in which the spool shaft and the cam shaft are arranged. Thus, even if the cam shaft and the spool shaft are obliquely mounted relative to each other and the distance therebetween varies with reciprocation of the slider, the first slider body does not interfere with movement of the second slider body relative to the cam shaft. As a result, the spool shaft is movable smoothly in the fore and aft direction.

Furthermore, the engaging condition between the traverse grooves and the guide member is not affected by variations in the distance between the spool shaft and the cam shaft so as to maintain a constant engaging depth therebetween, which prevents the guide member from becoming unevenly worn. Owing to this improved structure, it is possible to produce an optimal engaging condition between the cam shaft and the guide member which does not cause any clattering during movement of the second slider body, and further to take steps to enhance the durability of the guide member as well.

According to the present invention, since the spool shaft may be positively arranged so as not to be parallel to the cam shaft, the degree of freedom for the reel design will be increased which contributes to compactness of the reel body, for example.

Other objects and advantages of the present invention will be apparent from the following description of the preferred embodiments.

DESCRIPTION OF THE PREFERRED EMBODIMENTS

Embodiments of the present invention will be described hereinafter referring to the accompanying drawings.

Figure 3:
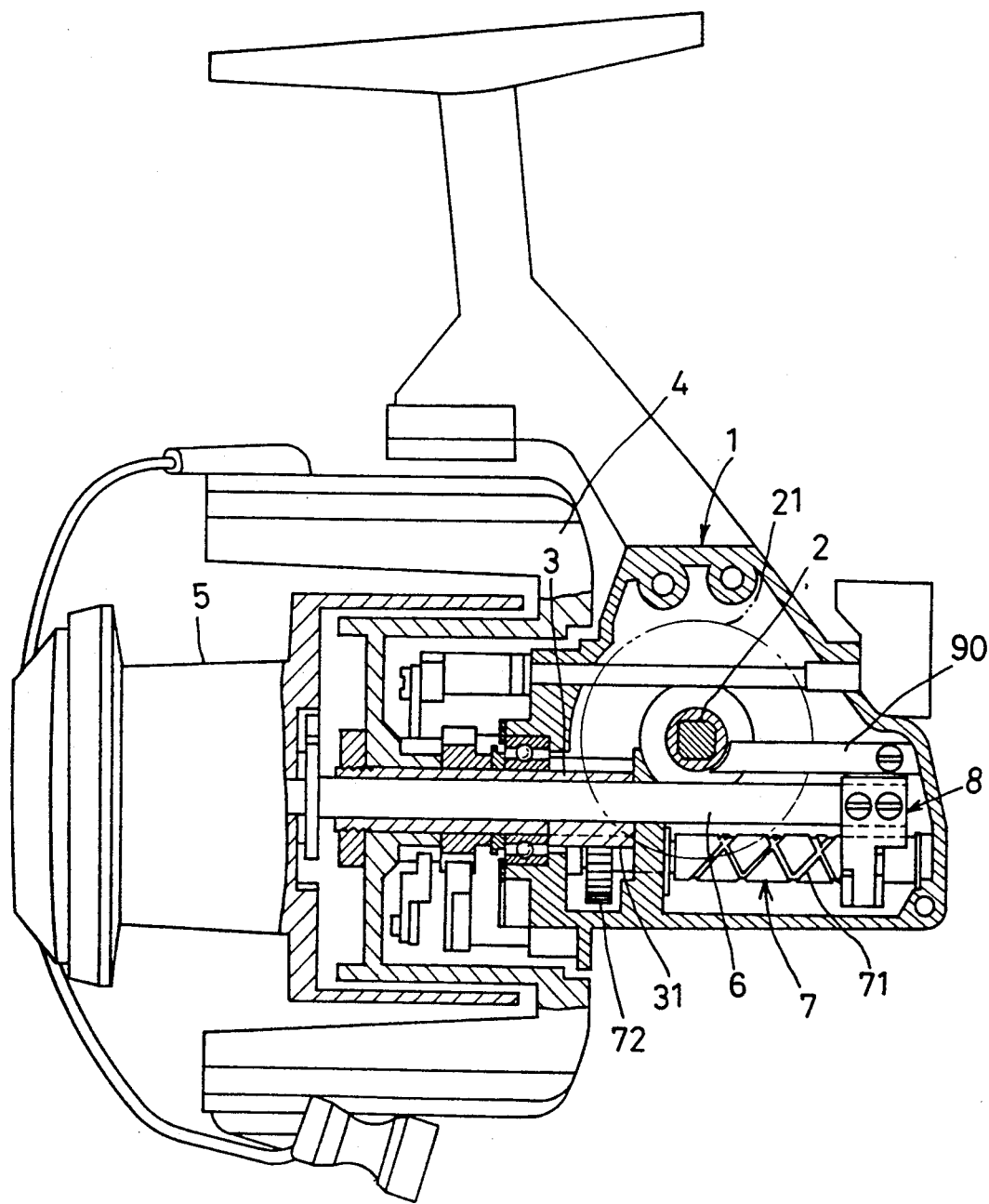
FIG. 3 is a partially broken-away side view of the entire reel body.

FIG. 3 shows a spinning reel according to the present invention which comprises a reel body 1, a handle shaft 2 rotated by operating a control handle rotatably supported by the reel body, a rotatable frame 4 rotated through a master gear 21 mounted on the handle shaft 2 and a pinion gear 31 mounted on a sleeve shaft 3, a spool shaft 6 axially reciprocated through the pinion gear 31, an interlocking gear 72, a cam shaft 7, a guide member 81 and a slider 8, and a spool 5 mounted on the spool shaft 6 for winding a fishing line thereon.

The reel body 1 is hollow inside and rotatably supports the handle shaft 2 having the master gear 21 between opposite lateral side walls thereof. The handle shaft 2 carries the control handle (not shown) adjacent an outer end of the reel body 1. The sleeve shaft 3 provided with the pinion gear 31 engaging the master gear 21 extends perpendicular to the handle shaft 2 and is rotatably supported by a front wall of the reel body 1. The rotatable frame 4 is mounted on a forward portion of the sleeve shaft 3. The spool shaft 6 carrying the spool 5 in an extreme end thereof is supported inside the sleeve shaft 3 to be reciprocable in a fore and aft direction.

Figure 1:
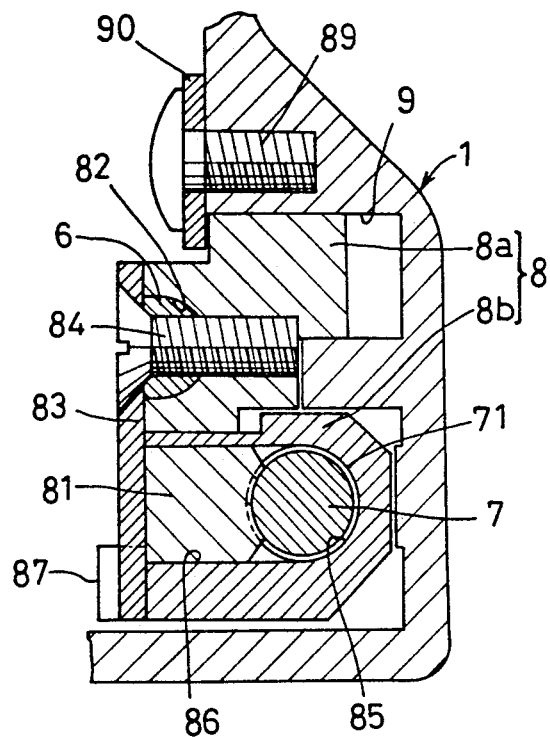
FIG. 1 is a sectional view showing a main portion of a spinning reel according to the present invention.
Figure 4:
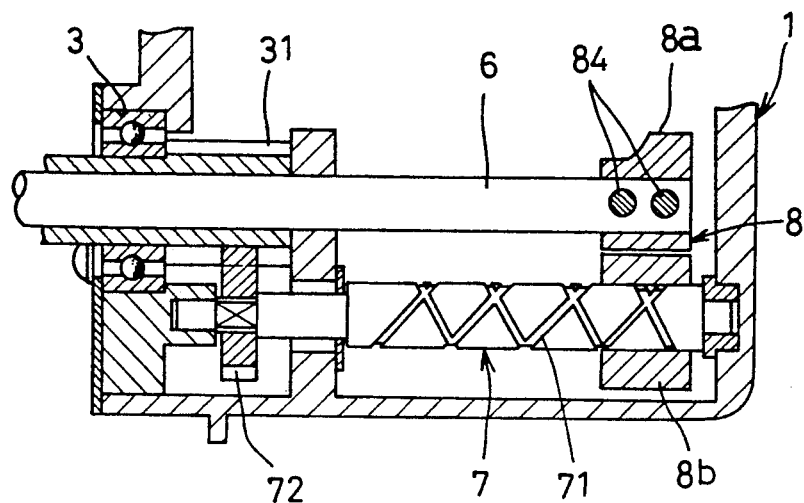
FIG. 4 is a partial enlarged sectional view of FIG. 3.

As shown in FIGS. 1 and 4, the cam shaft 7 defining reciprocative spiral traverse grooves 71 in an outer periphery thereof is rotatably supported parallel to the spool shaft 6 between front and rear walls of the reel body 1. The interlociing gear 72 mounted on a forward end of the cam shaft 7 is engaged with the pinion gear 31 thereby to rotate the cam shaft 7 by rotation of the handle shaft 2. The spool shaft 6 and the cam shaft 7 are operatively interconnected through the slider 8 having the guide member 81 engaging the traverse grooves 71 for moving the spool shaft 6 in the fore and aft direction by rotation of the cam shaft 7. The reel body 1 defines a recessed guide portion 9 in an inner surface of one of the side walls thereof for guiding the slider 8 axially of the spool shaft 6.

The slider 8 consists of a first slider body 8a mounted on the spool shaft 6 and a second slider body 8b having the guide member 81 and supported by the cam shaft 7. The first and second slider bodies 8a and 8b are interlocked with each other only in a moving direction of the spool shaft 6.

Figure 2:
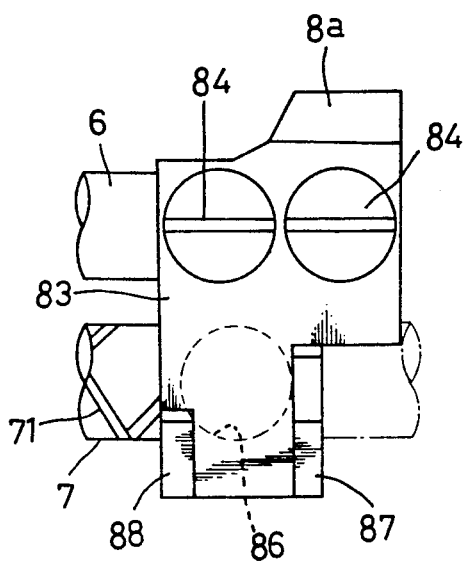
FIG. 2 is a fragmentary side view of the main portion.

More particularly, as shown in FIGS. 1 and 2, the first slider body 8a defines a recess 82 in one of lateral side faces thereof for fixing the spool shaft 6, and is rigidly mounted on a rear end of the spool shaft 6 through flush bolts 84 screwed from the outside of an interlocking plate 83 attached to the aforementioned lateral side face. The first slider body 8a also defines an engaging portion on the opposite lateral side face thereof for engaging the guide portion 9 so as to guide the first slider body 8a in the moving direction of the spool shaft 6 along the guide portion 9. Numeral 90 denotes a pressing plate for reliably maintaining the engagement between the engaging portion defined in the first slider body 8a and the guide portion 9, the pressing plate being fixed to an inner face of one of the lateral side walls of the reel body 1 through a bolt 89.

The second slider body 8b defines a perforation 85 through which the cam shaft 7 extends, and a retaining bore 86 in one of lateral side faces for communicating with the perforation 85. The retaining bore 86 receives the guide member 81 such that an extreme end of the guide member engages the reciprocative spiral traverse grooves 71 defined in the cam shaft 7 at all times. An inner diameter of the perforation 85 is substantially the same as an outer diameter of the cam shaft 7 whereby the second slider body 8b is axially movable relative to the cam shaft 7 while maintaining a constant engaging depth between the guide member 81 and the traverse or cam grooves 71. The retaining bore 86 of the second slider body 8b is provided in opposite lateral sides thereof with interlocking projections 87 and 88 opposed to each other axially of the cam shaft 7. The interlocking plate 83 attached to the first slider body 8a has a lower portion extending between and tightly contacting the interlocking projections 87 and 88 without defining spaces therebetween whereby the first slider body 8a is interlocked with axial movement of the second slider body 8b. The second slider body 8b has a top face contacting a bottom face of the first slider body 8a thereby to prevent the second slider body 8b from rotating about the cam shaft 7. The interlocking projections 87 and 88 may be interconnected at extreme ends thereof through a bridge.

The guide member 81 consists of a cylindrical base portion having a diameter corresponding to that of the retaining bore 86 and an engaging projection projecting outwardly from an end face of the base portion for engaging the traverse grooves 71. The guide member 81 is deterred from disengaging from the retaining bore 86 by the interlocking plate 83 closing the retaining bore 86.

With the foregoing structure, the handle shaft 2 rotates the cam shaft 7, as a result of which rotational drive is transmitted from the handle shaft 2 to the cam shaft 7 and then through the engagement between the guide member 81 and the traverse grooves 71 to the second slider body 8b, the interlocking plate 83 and the first slider body 8a. Then the drive is converted into axial drive to reciprocate the spool shaft 6 in the fore and aft direction of the reel body 1.

In working the present invention, the guide member 81 and the interlocking plate 83 may be interposed by a washer so as to adjust the engaging depth between the guide member 81 and the traverse grooves 71.

Other embodiments of the present invention will be described below.

In order to interlock the first and second slider bodies 8a and 8b only in the axial direction of the spool shaft, the foregoing embodiment employs the interlocking plate 83 fixed at an upper portion thereof to the first slider body 8a and retained at the lower portion thereof between the pair of interlocking projections 87 and 88 mounted on the second slider body 8b. This interlocking plate structure may be inverted. One of the first and second slider bodies 8a and 8b may define an interlocking projection while the other of the first and second slider bodies may define an engaging portion for engaging the interlocking projection. The structure of the interlocking means is not specifically limited.

The spool shaft 6 and the cam shaft 7 may be positively arranged in a non-parallel relationship unlike the foregoing embodiment in which they are arranged substantially parallel to each other. Such arrangement can enhance a degree of freedom for the reel design. For instance, the spool shaft 6 and the cam shaft 7 may be disposed such that the distance between the shafts becomes gradually narrower toward a rear portion of the reel body 1, which allows a structure in that portion to be reduced in size. In this case, the second slider body may include a projection and the first slider body may define a groove for slidably receiving the projection thereby to establish an interlock between the two slider bodies.

What is claimed is:

1. A spinning reel comprising:
   a reel body;
   a spool supported frontwardly on said reel body through a spool shaft, said spool being reciprocal in a front and rear direction;
   a cam shaft supported on said reel body which is substantially parallel to said spool shaft, said cam shaft not being capable of reciprocating in said front and rear direction and being rotatable about its axis, said cam shaft having peripheral spiral cam grooves;
   a slider body including;

a first slider body fixed on said spool shaft, said first slider body being displaceable in said front and rear direction with said spool shaft;

a second slider body mounted on said cam shaft, said second slider body maintaining a guide member with an end engaged in said cam groove of said cam shaft;

a connecting means for connecting said second slider body to said first slider body in such a manner that displacement of said second slider body relative to said first slider body is prohibited only in said front and rear direction;

a guide portion defined on said reel body including:

a first guide portion to restrict a displacement of said first slider body in a direction normal to said shaft to guide said first slider body in said front and rear direction in a complete stroke of said first slider body; and, a second guide portion formed as a channel in which said second slider body is capable of sliding along said front and rear direction, a shape of said second guide portion being determined so that a play exists between said second guide portion and said second slider body to permit said second slider body to move along a plane normal to said front and rear direction.

2. A spinning reel as defined in claim 1 wherein said connecting means consists of a pair of projections defined on said second slider body, said first slider body being substantially maintained between said pair of projections.

* * * * *